June 2, 1964

P. RUETSCHI 3,135,674

METHOD AND APPARATUS FOR THE PURIFICATION OF WATER

Filed June 6, 1960

*INVENTOR.*
PAUL RUETSCHI

INVENTOR.
PAUL RUETSCHI

United States Patent Office 3,135,674
Patented June 2, 1964

3,135,674
METHOD AND APPARATUS FOR THE
PURIFICATION OF WATER
Paul Ruetschi, Yardley, Pa., assignor to The Electric Storage Battery Company, a corporation of New Jersey
Filed June 6, 1960, Ser. No. 34,233
9 Claims. (Cl. 204—151)

The present invention generally relates to means for purifying saline water. More specifically, the present invention is concerned with an apparatus utilizing electrochemical means for the purification of water.

The need has long been recognized for means of augmenting the supply of fresh water to meet the demands of expanding population, industry and agriculture, both in the United States and the undeveloped countries of the world. Numerous water purification processes have been investigated but technical feasibility and economy studies have narrowed the field of processes to five broad groups: distillation through artificial heat, solar distillation, separation of salt by membrane processes, freezing and other chemical or electrical means of operation. While each of the five groups of processes offer hope of technical feasibility, they are all characterized by high cost of operation. The best published figures indicate an operating cost of above $1.00 per thousand gallons of purified water for the first three processes. Pilot plant operation of the freezing process indicate that its cost may eventually be reduced to approximately $.40 per thousand gallons, but even this is still too costly for universal application.

Accordingly, it is an object of the present invention to provide a new and improved means for purifying water which is characterized by high efficiency and low cost of operation.

Another object of the present invention is to provide a new and improved means for purifying water based entirely on a new electrochemical principle.

While attempts have been made in the past to purify water by electrochemical means, investigations have been limited to electrochemically controlled adsorption-desorption on porous conductors. For this purpose the purification cells contain porous graphite electrodes separated by anion selective membranes. In operation of this process, cations are absorbed on the high surface area of the porous carbon electrodes by applying a negative potential thereto. The negative chloride ions move through the anion exchange membrane to the other electrode which is made electrically positive and in this manner water flowing through the porous electrode matrices is depleted of both types of ions. The membrane is necessary in this type of cell because of a lack of suitable anion responsive electrodes. On concentration up to 0.01 normal saline solutions test cells of this type gave fairly complete demineralization. However, since the normality of sea water is 0.5, the process leaves much to be desired. It should be noted that in this process the demineralization of water is not truly an electrochemical reaction since the reaction is only a surface adsorption-desorption process brought about by the applied potential.

It is still another object of the present invention to provide new and improved electrodes for water purification which are capable of true electrochemical conversion for water purification.

It is a further object of the present invention to provide an electrochemical means for purifying water which is completely reversible and which has substantially 100% current efficiency.

In accordance with the present invention, there is provided a means for purifying saline water in which the water to be purified is passed through a bed of porous silver particles while the bed is anodized. Two compartments are utilized, the first compartment containing the porous silver electrode and the second compartment a porous silver chloride electrode. The two compartments are separated by a cation exchange membrane. In operation the silver electrode is anodized and the silver chloride electrode is cathodized. Sea water is passed simultaneously through both compartments. In the anode compartment the chloride ions are precipitated as silver chloride by anodizing the silver. In the cathode compartment chloride ions are liberated from silver chloride by cathodizing. The sodium ions from the anode compartment migrate through the cation exchange membrane into the cathode compartment where they neutralize chloride ions being liberated. As a result, the water flowing through the anode compartment is purified while the salt concentration of the water flowing through the cathode compartment is increased. After substantially all of the silver and the silver chloride have been converted to the chloride and to metallic silver respectively, the current is simply reversed and the electrode which was originally the anode is then the cathode increasing the saline concentration of the water passing therethrough and the electrode which was originally the cathode is then the anode purifying the water flowing therethrough.

A better understanding of the present invention may be had from the following description when read with reference to the accompanying drawings of which:

Figure 1:
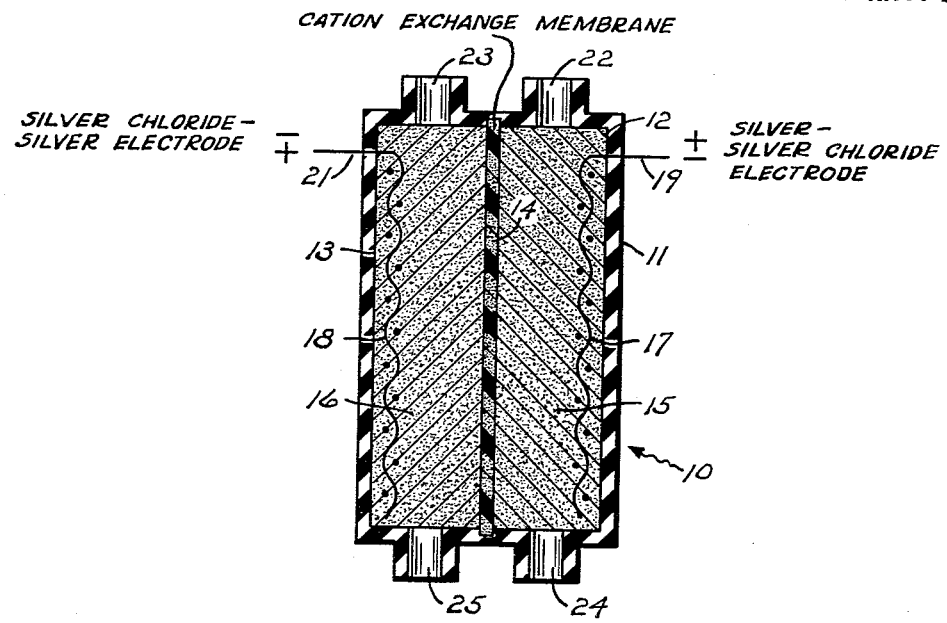
FIG. 1 is a sectional elevation of one embodiment of the present invention.

Referring now to FIG. 1, the numeral 10 indicates a water purification cell in accordance with the present invention having a container 11 which may be made of suitable insulating material such as hard rubber or a thermoplastic resin. As shown, the cell container 11 is divided into two compartments 12 and 13 by means of a cation exchange membrane. The compartments 12 and 13 are adapted to house the electrodes of the present invention which as noted hereinbefore are reversible. For the purposes of this explanation it will be assumed that until reversed the compartment 12 houses an anode 15 which comprises a porous bed of finely divided metallic silver particles and the compartment 13 houses a cathode 16 which comprises a porous bed of finely divided silver chloride particles. The electrodes 15 and 16 may be structurized as by sintering, be bound in a porous thermoplastic matrix or may be structurized as by pressure. Still further, it has been found desirable to incorporate finely divided silver particles in the silver chloride electrode so as to enhance the conductivity of that electrode. For this purpose, a mixture of two parts by weight of finely divided silver chloride particles and one part by weight of metallic silver has been found to provide a suitable electrode for water purification purposes. The electrodes 15 and 16 each have conductive grid members 17 and 18 which are adapted for connection to an external source of power by means of the lead conductors 19 and 21 respectively. The grid members 17 and 18 may comprise metallic screens, sheets of expanded metal, or may comprise a network of wires suitably located throughout the electrodes. The water is introduced into the compartments 12 and 13 by means of the water input passages 22 and 23 respectively and discharged therefrom by means of water discharge passages 24 and 25.

In operation, the saline water is passed simultaneously as by gravity or by pumping means, through the porous electrodes 15 and 16 while these electrodes are respectively polarized positive and negative. At the anode 15, the chloride ions in the saline water are precipitated as silver chloride by anodizing the silver. Simultaneously, at the cathode 16, chloride ions are liberated from the silver chloride under the influence of the applied current. Sodium ions liberated in the anode compartment migrate through the cation exchange membrane 14 into the cathode 16 where they neutralize the chloride ions being liberated increasing the concentration of the water passing through that compartment. The cation exchange membrane 14 facilitates the transfer of sodium ions from the anode compartment to the cathode compartment and minimizes diffusion of chloride ions from the cathode compartment to the anode compartment.

The electrochemical reaction by which the salt concentration of the water in the anode compartment is lowered is as follows:

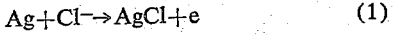

$$Ag + Cl^- \rightarrow AgCl + e \quad (1)$$

The reaction which takes place in the cathode compartment by which the salt concentration of the water flowing therethrough is increased is the reverse of the reaction described by Equation 1 and is as follows:

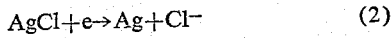

$$AgCl + e \rightarrow Ag + Cl^- \quad (2)$$

After substantially all of the silver has been converted to silver chloride and all the silver chloride converted to silver the polarities of the electrodes may be reversed making the electrode in the compartment 12 the anode and the electrode in compartment 11 the cathode. Upon reversal of the cell, the water flowing through compartment 12 is desalted while the salinity of the water flowing through compartment 11 is increased. It should be noted, however, that for best operation the cell should be reversed before the complete conversion of the silver in the anode to silver chloride in order that that electrode will maintain good conductivity. Further, in operation the current flow should be adjusted to the water flow rate to avoid production of silver oxides at the anode and hydrogen evolution at the cathode.

Figure 2:
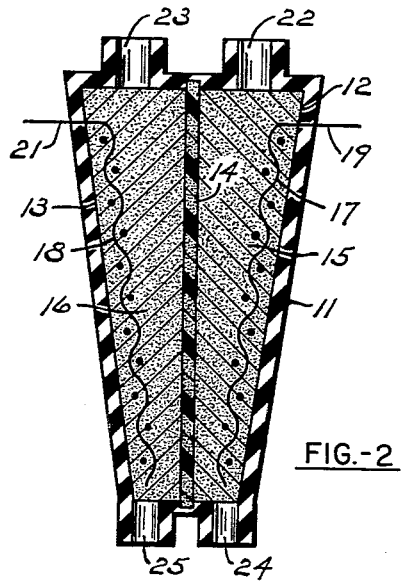
FIG. 2 is a sectional elevation of the modifications of the embodiment of the present invention shown in FIG. 1 which is designed to reduce the concentration gradient across the membrane separating the electrode compartments.

Referring now to FIG. 2, there is shown a modification of the embodiment of the present invention shown in FIG. 1 which is adapted for more efficient utilization of the electrode materials. Similar reference characteristics have been employed to designate components similar to those utilized in FIG. 1. As shown, this embodiment of the present invention is identical to the embodiment shown in FIG. 1 except that the electrodes 15 and 16 and the electrode compartments 12 and 13 are tapered with the greatest electrode area being provided at the input end of the cell. This construction provides more electrochemically active material for water purification in the area of the cell where the concentrations of the solutions are the greatest.

In order to demonstrate the feasibility of the water purification system in accordance with the present invention a test cell of the type shown in FIG. 2 was constructed. The electrodes were 7" high, 2" wide, 0.35" thick at the top and 0.1" thick at the bottom. The electrodes were separated by a cation exchange resin which comprised a strong sulphonic acid type cation exchange resin uniformly distributed through a matrix of polyethylene. The silver electrode comprised 167 grams of finely divided metallic silver structurized by pressing. The silver chloride electrode comprised 87 grams of finely divided silver chloride having uniformly dispersed therethrough 44 grams of finely divided silver powder. This electrode was also structurized by pressure. Each electrode had a grid of expanded silver metal embedded therein.

A 0.5 normal solution of sodium chloride was allowed to flow by gravity through the anode and cathode compartments of the test cell at a rate of 15 cc. per hour. The current flow to the cell was maintained at 200 milliamperes providing a cell voltage of 0.25 volt. This current is that which theoretically would completely desalt the water passing through the anode compartment at the flow rate noted above. After one hour a sample was taken of the solution leaving the anode compartment and it was 0.22 normal. The solution being discharged from the cathode compartment was 0.78 normal. After 20 hours the water being discharged from the anode compartment was 0.11 normal while the water being discharged from the cathode compartment was 0.75 normal. The flow rate was then adjusted to 10 cc. per hour through the anode compartment and to 7 cc. per hour through the cathode compartment. After four hours the water being discharged from the anode compartment was 0.73 normal while the water being discharged from the cathode was 0.71 normal. After a few days of operation, the cell was reversed and the flow adjusted to 27 cc. per hour through the anode compartment and 19 cc. per hour through the cathode compartment. Upon reversal of the cell, the current rate was increased to 0.5 milliampere providing the cell voltage of 0.4 volt. After four hours of operation the concentration of the water leaving the anode compartment was 0.10 normal and the concentration of the water being discharged from the cathode compartment was 0.98 normal.

To demonstrate the effectiveness of the cell for purifying waters of a brackish type, that is, waters having a saline concentration of approximately 0.1 normal, water of that normality was passed through the test cell at a rate of 114 cc. per hour through the anode compartment and at a rate of 102 cc. per hour through the cathode compartment. The cell current was adjusted to 0.75 milliampere providing a cell voltage of 0.4 volt. After several hours the concentration of the water being discharged from the anode compartment was 0.03 normal and while the concentration of the water being discharged from the cathode compartment was 0.16 normal. The rate of water flow through the cell was then reduced to 75 cc. per hour through the anode compartment and 65 cc. per hour through the cathode compartment. The cell current was adjusted to 0.5 ampere providing a cell voltage of 0.38 volt. After several hours the concentration of the water being discharged from the anode compartment was 0.03 normal and that being discharged from the cathode compartment was 0.16 normal. These tests demonstrate the complete feasibility and high efficiency of water purifying cells incorporating the principles of the present invention. It should be noted that this test cell had an efficiency of approximately 60% to 70%.

Figure 3:
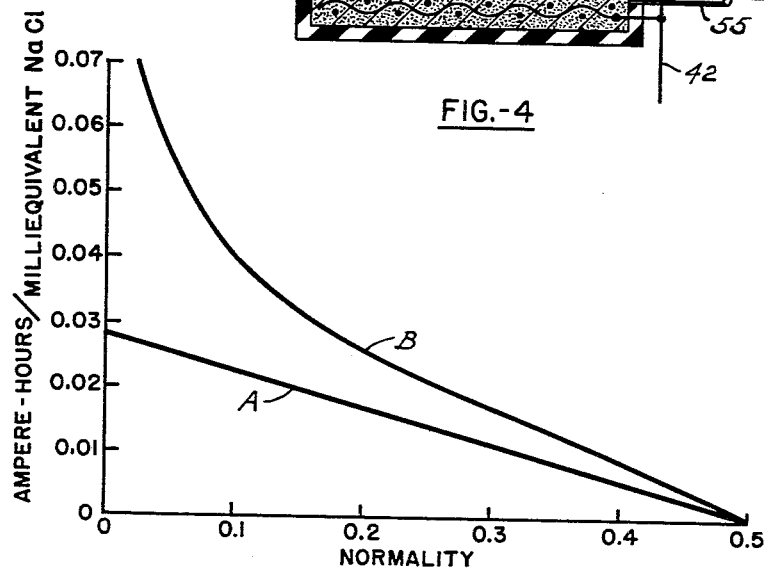
FIG. 3 is a graph on which there is plotted the theoretical and actual efficiency of a test cell made in accordance with the teachings of the present invention.

Referring now to FIG. 3 there is shown a graph on which there is plotted the theoretical and actual efficiency of a water purification cell of the type shown in FIG. 2. The abscissa is the concentration of the effluent discharged from the anode. The ordinate is the number of ampere hours input per milequavalent of sodium chloride flowing through the anode compartment. The curve A indicates the calculated theoretical efficiency of the cell and the curve B the actual or measured efficiency. It should be noted in considering these curves that the efficiency of the cell can be greatly improved, that is, the actual efficiency can be made to approach more closely the theoretical efficiency, by improved cell geometry and by a more efficient ion exchange membrane. In the latter respect, it should be noted that since the cation exchange membrane separating the anode compartment from the cathode compartment is not ideally selective or 100% efficient that it does not prevent the diffusion of some chloride ions from the compartment having the higher concentration to the compartment having the lower concentration.

Figure 4:
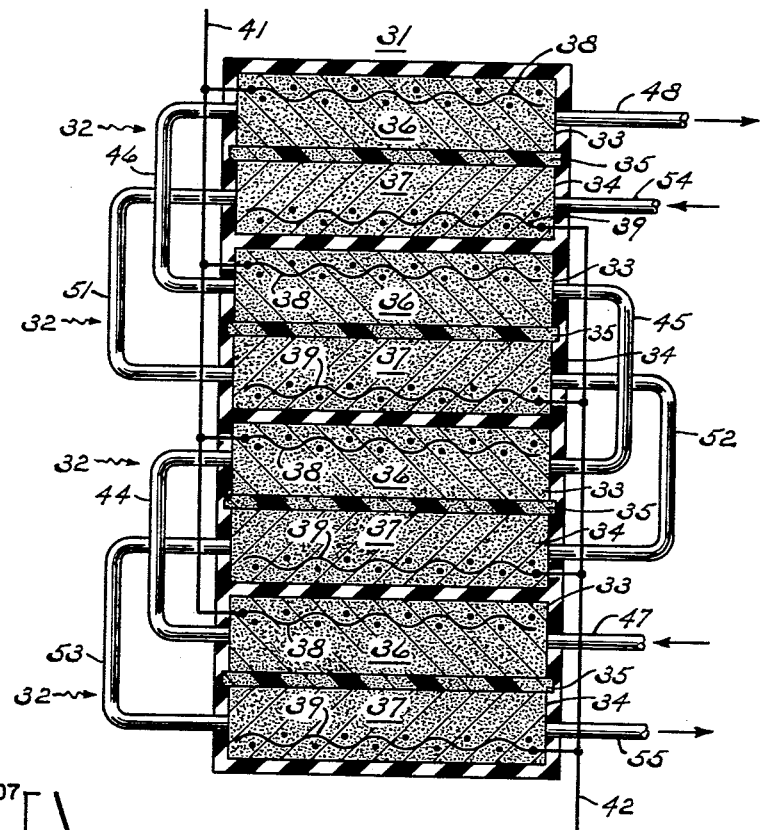
FIG. 4 is a sectional elevation of another embodiment of the present invention utilizing a plurality of inner connected stages.

Back diffusion of chloride ions causes the major loss of efficiency in the cell. The back diffusion of chloride ions can be greatly minimized, however, by adjusting the flow rates through the compartments such that the flow rate through the cathode compartment is very much greater than the flow rate through the anode compartment. In this manner build-up of a high concentration of chloride ions in the cathode compartment is prevented minimizing the concentration gradient between the two compartments. Another method of reducing the concentration gradient across the cation exchange membrane is to use a multiple stage system with the counter-current water feed as illustrated in FIG. 4. In addition, the preferred mode of cell operation is one in which the saline solution is fed into the bottom of the cell and out the top, thus having the dilute affluent at the top of the cell to avoid internal mixing.

The energy required to produce pure water in a cell of the present invention depends, of course, on the current and voltage utilized. In the present invention, the current is utilized almost 100% for the purification of water. The voltage drop across the cell is due to polarization and resistance losses of the electrodes and can be kept below 0.4 volt.

Referring now to FIG. 4, there is shown an embodiment of the present invention utilizing a plurality of series connected water purification stages with countercurrent water feed. The numeral 31 designates a cell container of a suitable insulating material having a plurality of water purification cells 32. Each of the cells 32 has a pair of electrode compartments 33 and 34 separated from each other by a cation exchange membrane. As in the other embodiments of the present invention, each of the electrode compartments 33 and 34 are adapted to house a reversible electrode. For the purpose of this explanation, it will be assumed that until reversal of the cell the compartments 33 house the anodes 36 and that the compartments 34 house the cathodes 37. The anodes 36 are porous silver electrodes and the cathodes 37 are porous silver chloride electrodes. The electrodes 36 and 37 have conductive grids 38 and 39 respectively. As shown, the conductive grids 38 are connected to a common current source 41 and similarly the conductive grids 39 are connected to a common current source 42 of the opposite polarity.

The anode compartments 32 are connected for series water flow by means of the conduits 44, 45 and 46. The saline water to be purified is fed into the lowermost anode compartment 32 by means of an input conduit 47 and purified water is discharged from the uppermost anode compartment 32 through the discharge conduit 48. Similarly, the cathode compartments 34 are connected for series water flow by means of the conduits 51, 52 and 53. In order to reduce the concentration gradient across the membranes 35, pure water or a dilute saline solution the concentration of which will be increased in the purifying of the water flowing through the anode compartments is fed into the uppermost cathode compartments 34 through the input conduit 54 and discharged from the lowermost cathode compartment 32 by means of the discharge conduit 55.

In operation, each of the water purification stages 32 operate in the manner specified hereinbefore with the salt concentration of the water flowing through the anode compartments becoming lower at each successive stage. Conversely, the salt concentration of the water flowing through the cathode compartments becomes greater at each successive stage. Since these two flows are in a countercurrent relationship with each other, the concentration of both flows are maintained on a par across each of the cation exchange membranes. It should be understood that while each of the stages 32 are shown being operated at the same voltage that different voltages can be provided by utilizing separate current sources for each stage. It should also be understood that this embodiment of the present invention is also reversible and that upon substantial conversion of the electrode material to the opposite specie the polarity of the current flow may be reversed and the path of water flow also reversed with respect to the electrode compartments.

Having described the present invention, that which is claimed as new is:

1. An apparatus for desalting liquids which comprises, in combination, a porous electrode of metallic silver, a porous electrode of silver chloride, a cation exchange membrane separating said electrodes, means for energizing said electrodes with an electric current such that said silver electrode is made electrically positive with respect to said silver chloride electrode, means for passing the liquids to be desalted through said silver electrode and means for passing a second liquid, the salt content of which may be increased, through said silver chloride electrode.

2. An apparatus as specified in claim 1 wherein said electrodes are tapered, said electrodes having the greatest area at the liquid input end.

3. An apparatus for desalting liquids which comprises in combination, a container having a pair of electrode compartments, cation exchange membrane separating said compartments, a structurized porous silver electrode in one of said compartments, a structurized porous silver chloride electrode in the other of the said compartments, each of said compartments having a liquid input passage and a liquid discharge passage, and means for supplying electric current to said electrodes such that said silver electrode is made positive with respect to said silver chloride electrode.

4. Apparatus as specified in claim 3 wherein said silver chloride electrode contains metallic silver.

5. An apparatus for desalting water comprising, in combination, a pair of electrically reversible porous electrodes, one of said electrodes being metallic silver, the other of said electrodes being silver chloride, a cation exchange membrane separating said electrodes and means for simultaneously passing water past both electrodes.

6. An apparatus for desalting water which comprises, in combination a plurality of similar stages each comprising an anode of porous metallic silver and a cathode of porous silver chloride separated by a cation exchange membrane, water flow means connecting said anodes in series, water flow means connecting said cathodes in series, means for passing the water to be desalted through said series-connected anodes and means for passing water the salt content of which can be increased through said series-connected cathodes in a countercurrent relationship to said flow of water to be desalted.

7. An apparatus for desalting water which comprises, in combination, an insulated container having a plurality of water desalting cells, each of said cells having a pair of electrode compartments separated from each other by a cation exchange membrane, a porous silver electrode in one of said compartments in each cell, a porous silver chloride electrode in the other compartment of each cell, means for supplying electric current to said electrodes such that said silver electrodes are made positive with respect to said silver chloride electrodes, means for passing the water to be desalted in series through said compartment housing said silver electrodes, and means for passing water the salt concentration of which can be raised in series through said compartments housing said silver chloride electrodes.

8. Apparatus as specified in claim 7 wherein said last named flow is in counter current to said flow of water to be desalted.

9. A method of desalting water which comprises passing the water to be desalted through an electrode of porous silver while said electrode is made electrically positive and simultaneously passing water the salt concentration of which can be increased through an electrode of porous silver chloride while said electrode is made electrically negative, said electrodes being separated from each other by a cation exchange membrane.

References Cited in the file of this patent

UNITED STATES PATENTS 2,681,884 Butler ---------------- June 22, 1954
2,898,282 Flook et al. -------------- Aug. 4, 1959
2,910,420 Preiser ---------------- Oct. 27, 1959

OTHER REFERENCES

Chemical Engineering, October 1954, vol. 61, No. 10, pp. 177–180.